UNITED STATES PATENT OFFICE.

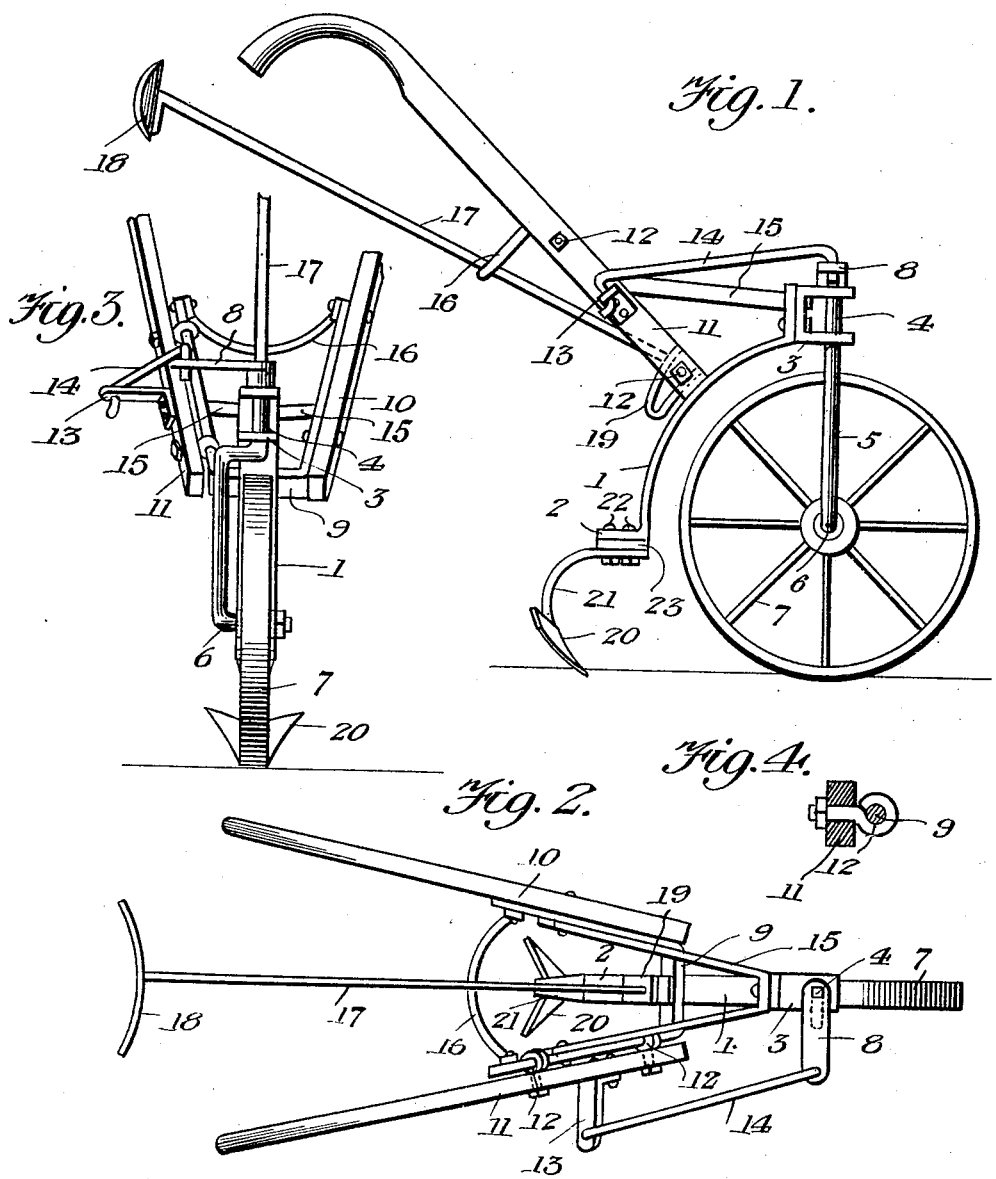

CHARLES E. ASKUE, OF SPRINGFIELD, ARKANSAS.

WHEEL GARDEN-PLOW.

1,324,719.   Specification of Letters Patent.   Patented Dec. 9, 1919.

Application filed November 26, 1918. Serial No. 264,179.

*To all whom it may concern:*

Be it known that I, CHARLES E. ASKUE, a citizen of the United States, residing at Springfield, in the county of Conway and State of Arkansas, have invented new and useful Improvements in Wheel Garden-Plows, of which the following is a specification.

This invention is an improved wheel garden plow for manual operation, the object of the invention being to provide an improved plow of this character which can be readily steered in any desired direction without the necessity of taking the plow out of the ground and which can be also adjusted as desired to arrange the plow handles at any required height.

With the above and other objects in view, the invention consists in the construction, combination and arrangement of devices hereinafter described and claimed.

In the accompanying drawings:

Figure 1 is an elevation of a garden plow constructed and arranged in accordance with my invention.

Fig. 2 is a plan of the same.

Fig. 3 is a transverse sectional view of the same.

Fig. 4 is a detail sectional view through one of the handles showing the adjustable connection therefor.

The plow stock 1 is here shown as curved and is provided at the rear end with a rearwardly extending arm 2. At the front end of the plow stock is a clevis 3 the upper and lower arms of which are provided with bearing openings for the reception of the shank 4 of a swivel rod 5, said swivel rod having its lower end bent to one side and forming a spindle 6 on which the wheel 7 is mounted. A steering arm 8 is attached to the upper end of the shank 4.

A transversely arranged U-shaped yoke 9 is secured on the plow stock and a handle 10 is secured to one arm of the yoke. A handle 11 carries a number of eye bolts 12, the eye portions of which surround the other arm of the yoke permitting a turning or partial rotation of the handle for the purpose to be presently described. The handle 11 also carries an outwardly extending arm 13 near its lower end. The said arm is connected by a rod 14 to the steering arm 8 and hence the steering arm is controlled by the handle 11 and the user of the plow by appropriately rotating the handle 11 can cause the spindle rod to turn the wheel 7 in any desired direction and thus enable the plow to be steered as desired without taking the plow from the ground. Braces 15 are provided for the handles, said braces being flexible and permitting the required movements of the pivotally mounted handle 11. The arms of the yoke are connected together by an arcuate brace rod 16 which extends rearwardly therefrom.

To enable the plow to be readily pushed by the user, I provide a push rod 17 which has a breast plate 18 at its upper end and has its lower end connected to the upper arm of a cushioning spring 19, the lower arm of the cushioning spring being secured to the yoke 9 as shown. The push rod is supported in an inclined position by the curved brace rod 16.

The plow point, shovel, or other suitable earth working implement 20 has a curved standard 21 which is secured to the arm 2 of the plow stock by a pair of bolts 22. A spacer block 23 is also provided which may be inserted between said arm and standard in order to raise the handles. When the spacer block is removed the handles are lowered at their rear ends, as will be understood. Hence, the height of the handles can be regulated to suit the user of the plow. Any form of earth working implement, in connection with the plow, may be used.

While I have herein shown and described a preferred embodiment of my invention, I would have it understood that changes may be made in the form, proportion and construction of the several parts without departing from the spirit of my invention.

Having thus described my invention, I claim:

1. In a wheel plow of the class described, a stock having a right angularly disposed end portion, a supporting wheel for the front end of the stock, handles connected with the stock, an earth working implement having a standard bolted to said angular end of the stock and a spacer block interposed between the standard and the lower end of the stock to raise the handle.

2. In a wheel plow, a stock, a bracket at one end thereof, a vertical shaft swiveled in said bracket, said shaft having an offset end upon which said wheel is journaled, spaced handles, one of said handles being movable, and a connection between said shaft and movable handle for steering the plow.

3. In a wheel plow, a stock, a swivel member mounted in said stock, a wheel journaled on said member, handles on said plow, one of said handles being mounted for turning movement, and a connection between said handle and the swivel member to steer the plow in any desired direction.

4. In a wheel plow, a stock, a U-shaped member having a cross piece secured to said stock, a vertical shaft supporting said wheel and having a swivel connection with the stock, handles connected with the spaced limbs of said member, one of said handles being mounted for partial rotation, and a connection between said handle and shaft for steering the plow.

5. In a wheel plow, a stock, a U-shaped member having a cross piece secured to said stock, a vertical shaft supporting said wheel and having a swivel connection with said stock, spaced handles, eye bolts secured to one end of said handles and bracing one limb of said member, whereby said handle is capable of being partially rotated, and a connection between said rotatable handle and said shaft for steering the plow.

6. In a wheel plow, a stock, a bracket at one end thereof, a vertical shaft swiveled in said bracket, said wheel being journaled on the lower end of said shaft, spaced handles, one of said handles being mounted for partial rotation, a bracket carried by the movable handle, an arm projecting from the upper end of said shaft, and a link connecting said arm and bracket for steering the plow by means of said movable handle.

In testimony whereof I affix my signature.

CHARLES E. ASKUE.